United States Patent
McDonnell et al.

[15] 3,683,788
[45] Aug. 15, 1972

[54] APPARATUS FOR RIPENING FRUIT AND THE LIKE

[72] Inventors: Gerald F. McDonnell, Birmingham, Ala.; Hugh T. Freebairn, Houston, Tex.

[73] Assignee: Banana Control, Inc., New Orleans, La.

[22] Filed: July 1, 1970

[21] Appl. No.: 60,206

Related U.S. Application Data

[60] Division of Ser. No. 767,426, Oct. 14, 1968, Pat. No. 3,620,765, which is a continuation-in-part of Ser. No. 523,327, Jan. 27, 1966, abandoned.

[52] U.S. Cl..................................99/239, 99/103
[51] Int. Cl..............................................B65g 1/00
[58] Field of Search........99/239, 259, 271, 339, 100, 99/154, 103

[56] References Cited

UNITED STATES PATENTS

| | | |
|---|---|---|
| 2,625,095 | 1/1953 | Julian..........................99/259 |
| 2,711,471 | 6/1955 | Sussman......................99/154 |
| 3,183,683 | 5/1965 | Reiter et al. ..........99/154 UX |
| 3,234,028 | 2/1966 | Dunham et al........99/100 UX |
| 3,368,873 | 2/1968 | Fuller et al...............99/271 X |
| 3,400,650 | 9/1968 | Burg........................99/154 X |
| 3,459,116 | 8/1969 | McDonnell..................99/239 |
| 3,592,665 | 7/1971 | Macrill et al.............99/239 X |

Primary Examiner—Walter A. Scheel
Assistant Examiner—Arthur O. Henderson
Attorney—Mason, Fenwick & Lawrence

[57] ABSTRACT

A process and apparatus for accelerating the ripening of unripe fruits in boxes having air flow openings in the walls thereof, such as bananas, tomatoes, melons, pears, avocadoes, and the like, wherein the fruit is subjected to a timed initiating stage at temperatures of 68° to 95° F. in the presence of ethylene gas, and may then be subjected to subsequent stages of maturing, and of terminal temperature conditioning at selected temperatures, and times to achieve improved uniformity of ripening and prolonged shelf life. The apparatus includes timers, temperature sensors and heating and cooling means interconnected to automatically cycle the fruit through the ripening program.

5 Claims, 8 Drawing Figures

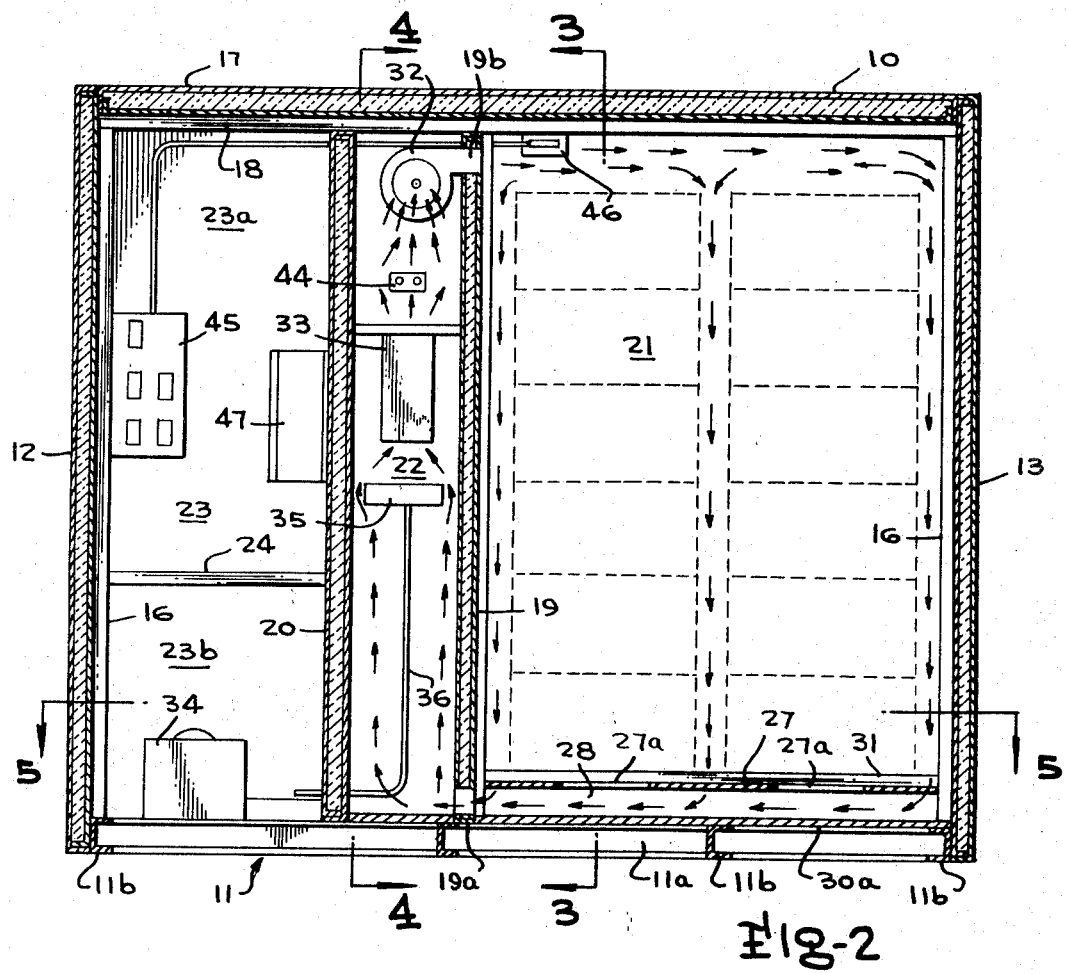
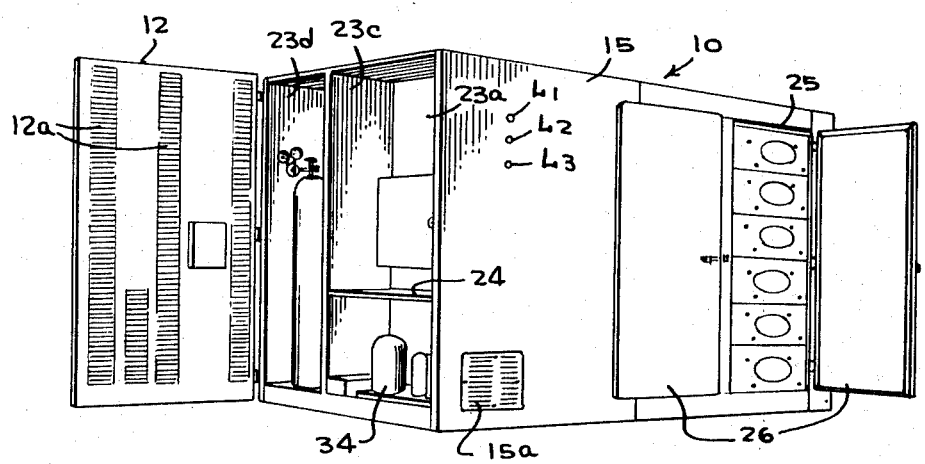

3,683,788

APPARATUS FOR RIPENING FRUIT AND THE LIKE

This is a division of application Ser. No. 767,426, now U.S. Pat. No. 3,620,765, filed Oct. 14, 1968.

Application Ser. No. 767,426 is a continuation-in-part of my earlier application Ser. No. 523,327, now abandoned filed Jan. 27, 1966 and entitled "-BANANA-MATIC."

BACKGROUND AND OBJECTS OF THE INVENTION

Under previous procedures for ripening bananas, the bananas were received from shipment in the form of stemmed fruit or "hands," as distinguished from present shipping methods wherein the fruit is boxed. These bananas were placed in warehouses for ripening, and after a period of time were then delivered from the warehouse to the retail stores where the bananas were to be displayed for sale. The warehouses required a large number of ripening rooms, so that the bananas could be assigned to individual rooms based on the date of delivery of the bananas to the retail stores. The ripening schedules were customarily 5 to 8 days from date of delivery of the bananas to the ripening rooms. A ripening room employee must supervise the regulation of temperatures in the individual ripening room in accordance with a selected schedule, requiring constant supervision of the banana ripening operation. Effort was normally made to maintain the temperatures within the ripening room in the range of 61° to 65° F., so that the bananas do not over-heat and spoil before delivery to the store. Initially, the ripening room employee, after storage of the bananas in the ripening room, brought all of the pulp temperatures to 60° F. or higher, but never exceeded 65° F. After most of the bananas have a pulp temperature of 60° F. or higher, pure ethylene was introduced into the ripening room for 24 hours. During this time the doors remain closed and were not opened until the 24-hour period was over. At the same time the gas was injected into the room, the room temperature was raised to 65° F.

After the 24-hour period, the ripening room doors were opened for ventilation and blowers flushed out the ethylene gas and carbon dioxide built up in the rooms. After the rooms were vented, the doors were closed and the room temperature was lowered to 62° or 60° F., depending on the ripening schedule. Sometimes the temperature range of 58° to 64° was used without ethylene gas, but the ripening cycle in such cases was 6 to 8 days. After the fourth day, when the ethylene gas was used, the bananas were a color No. 3 (more green than yellow) and were then transported to the stores. However, most deliveries from the warehouse took place 5, 6, 7 or 8 days from the time the bananas were first introduced into the ripening room. Since the biochemical processes or reactions for ripening of the bananas had already been initiated at the time the rooms were vented, aging of the bananas had already begun, induced by excess hormone resulting from its accumulation before and after the ethylene gas was injected into the ripening rooms or its indiscriminate addition, so that rapid degradation of the chlorophyll pigments were attained when desired. The frequent result was that overripe bananas of uneven color were transported to the stores and, because of their soft condition, were heavily bruised and scarred by the pressure of top hands of bananas on the bottom hands of bananas, causing permanent pulp and peel bruise. The bananas were delivered to the stores and stored in the back room where the temperature is normally 75° to 95° F. in the summer, and 40° to 45° in the winter. This produced many dehydrated and cooked bananas in the summer, and many underripe and chilled bananas in the winter. Both chilling and overripening cause dessication and result in tasteless, mealy bananas.

In accordance with conventional packaging and shipping methods, the bananas are stored in stacked box form in the ripening rooms. Attempts are made to control temperature by air diffusion, but when high air temperatures are used to achieve ripening of the bananas, great temperature variations are found to occur in the individual boxes, resulting in a higher pulp temperature than the room air temperature in some of the boxes. These non-uniform high heat areas are caused by the bananas giving off heat which is trapped in the middle and bottom boxes in each stack and the interior fruit in all boxes due to the ineffectiveness of the diffusion method of air flow used in such ripening rooms.

While it is possible to remove the fruit from the boxes for ripening, to do so frequently bruises the fruit, and in any event it is most time consuming.

Thus, under present mass handling conditions, it is particularly desirable to treat and handle all fruit while boxed in the usual cardboard boxes used for shipping. The size of these boxes varies with the type of fruit, but for bananas, the size is usually 21 × 16 × 10 inches with openings which serve as air passages, usually provided in all faces of the box.

Ripening of fruit in the boxes, while offering convenience and avoidance of injury, nevertheless poses the severe problem of attaining uniform ripening conditions within the boxes due to the heat buildup created by the fruit during ripening and the inaccessibility of the gaseous treating atmosphere to each fruit. Ripening in a boxed condition would also be expected to add substantially to the time of ripening, thus seeming to defeat attempts to speed up the ripening cycle.

Ideally, therefore, any ripening process should permit the ripening of boxed fruit without any undesirable loss in uniformity of treating conditions and, importantly, reduce rather than add to the ripening time. The present discovery attempts to achieve these goals.

It has been found desirable to ripen the bananas and other fruits in a ripening program wherein the boxed fruit is subjected to a first initiation stage to initiate the biochemical reactions for ripening simultaneously in every banana or finger of every hand of bananas or wherein the fruit is subjected to such an initiation stage and then to a second distinct stage for de-greening and maturing the bananas on every hand of bananas evenly or uniformly. To achieve the full benefit of the fruit so ripened and attain a long shelf life, the fruit may be subjected to a terminal low temperature stage of ripening. Each of these stages requires different careful regulated temperature ranges and time scheduling to achieve the proper initiation and rate of biochemical reactions and produce bananas uniformly having proper balance of texture, color, flavor, aroma and holding quality. The 59° to 65° F. temperature range customarily used in present ripening rooms at the warehouse represents a compromise for all of the biochemical reactions and thus is not the ideal range for any one stage.

It has also been found that faster and more uniform ripening of boxed green tomatoes, customarily having a variety of states of ripeness and ripening rates, and attainment of longer shelf life properties, can be achieved by similarly subjecting the tomatoes to distinct sequential stages of initiating, de-greening, and terminal low temperature ripening, at selected, accurately controlled temperatures and times and with introduction of controlled amounts of ethylene during the initiating stage. Other fruits, such as peas, avocadoes and melons, including honeydew and the like, and some vegetables, having comparable ripening reactions and characteristics, may be beneficially ripened in a similar manner at faster ripening rates to attain greater uniformity of ripeness and longer shelf life properties.

An object of the present invention is the provision of a novel process and apparatus for accelerating the ripening of boxed bananas, tomatoes, and comparable fruits in a ripening program having a first initiation stage under selected conditions of temperature and time which results in uniform initiation of ripening and more rapid ripening of the fruit to maturity.

Another object of the present invention is the provision of a novel process and apparatus for accelerating the ripening of boxed fruits in a ripening program having two distinct stages of ripening including a first initiating stage and a second de-greening and maturing stage, each having selected conditions of temperature and time.

Another object of the present invention is the achievement of long shelf life in boxed fruit ripened in two distinct stages, as described in the immediately preceding paragraph, and then maintained through a selected low temperature holding stage.

Another object of the present invention is to provide a process for the initiation of ripening of each boxed banana, tomato or like fruit simultaneously by subjecting such fruit to a controlled atmosphere within a specific range of temperature for a limited time.

Yet another object of the present invention is the provision of initiation of ripening of unripe boxed fruit with the application of relatively high heat under forced air conditions, thereby avoiding non-uniform high heat areas.

A further object of the present invention is the provision of a process for attaining greater uniformity in ripening of boxed fruit by withholding progression of the ripening of a fruit that has previously begun a natural ripening process and simultaneously initiating the ripening of other fruit which has not begun any ripening in order to attain more uniformity.

Another object of the present invention is the provision of novel apparatus for ripening boxed fruit, especially bananas, in proper sequence under automatic control in retail stores.

Still another object of the present invention is the provision of automatically controlled banana ripening apparatus, wherein the bananas can be stored at the retail store level and ripened in proper sequence through initiation, de-greening and maturing, and a selected terminal low temperature stage, having automatically controlled and cycled forced air heating and cooling facilities and ethylene gas introduction means for ripening bananas to a condition for retail sale at a more rapid rate.

Other objects, advantages and capabilities of the present invention will become apparent from the following detailed description, taken in conjunction with the accompanying drawings illustrating a preferred embodiment of apparatus for carrying out the invention.

BRIEF DESCRIPTION OF THE FIGURES

FIG. 1 is a perspective view of fruit ripening apparatus embodying the present invention;

FIG. 2 is a vertical longitudinal section view of the apparatus, taken along the line 2—2 of FIG. 1;

DETAILED DESCRIPTION OF A PREFERRED EMBODIMENT OF THE APPARATUS

Figure 3:
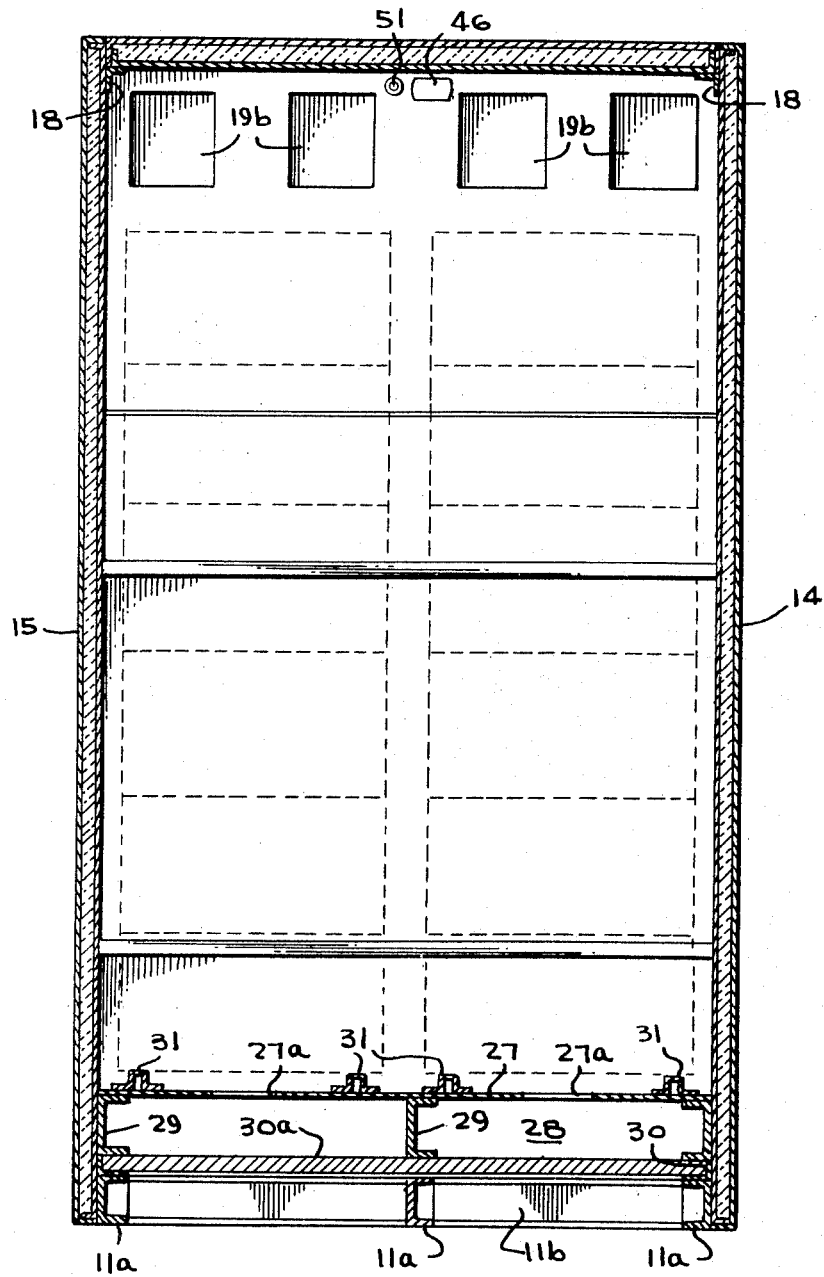
FIG. 3 and 4 are vertical transverse section views of the apparatus, taken along the lines 3—3 and 4—4, respectively, of FIG. 2.
Figure 4:
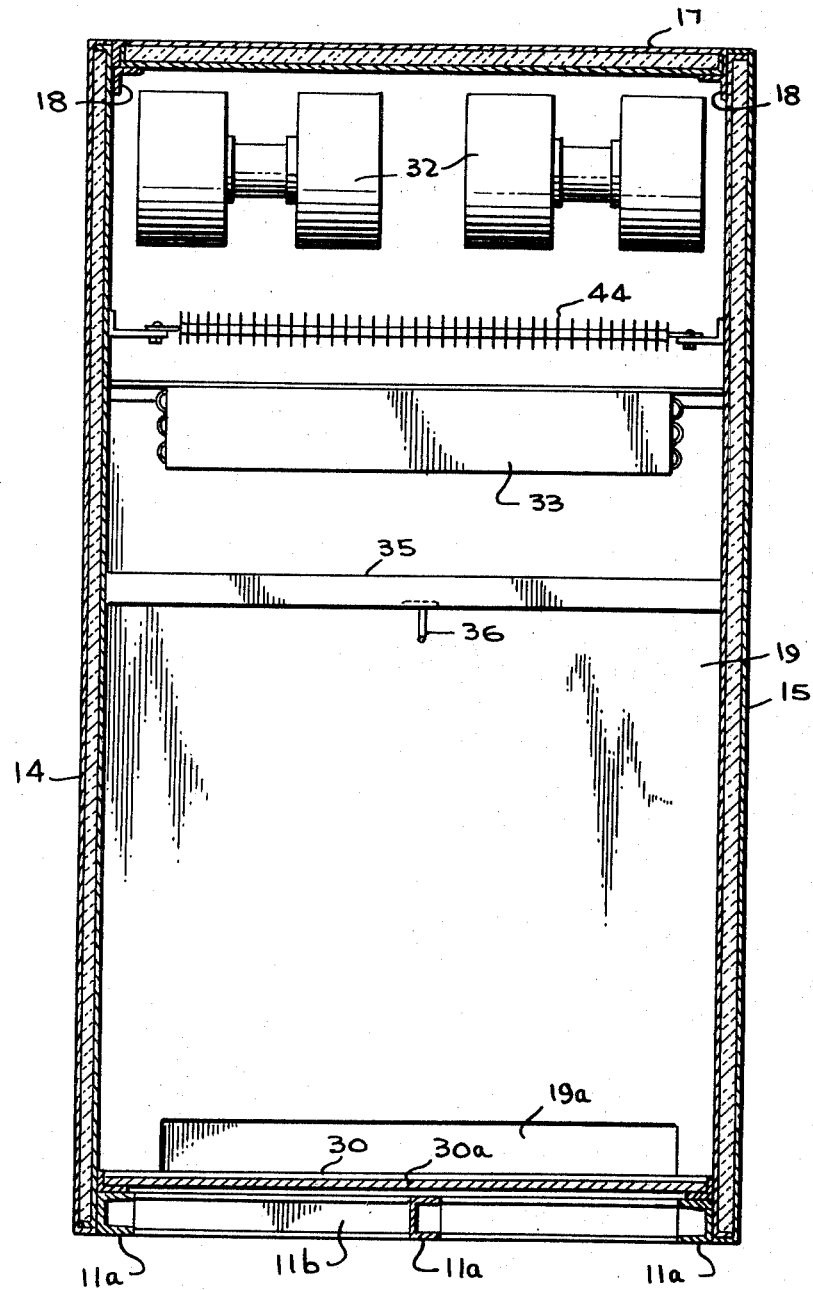
Figure 5:
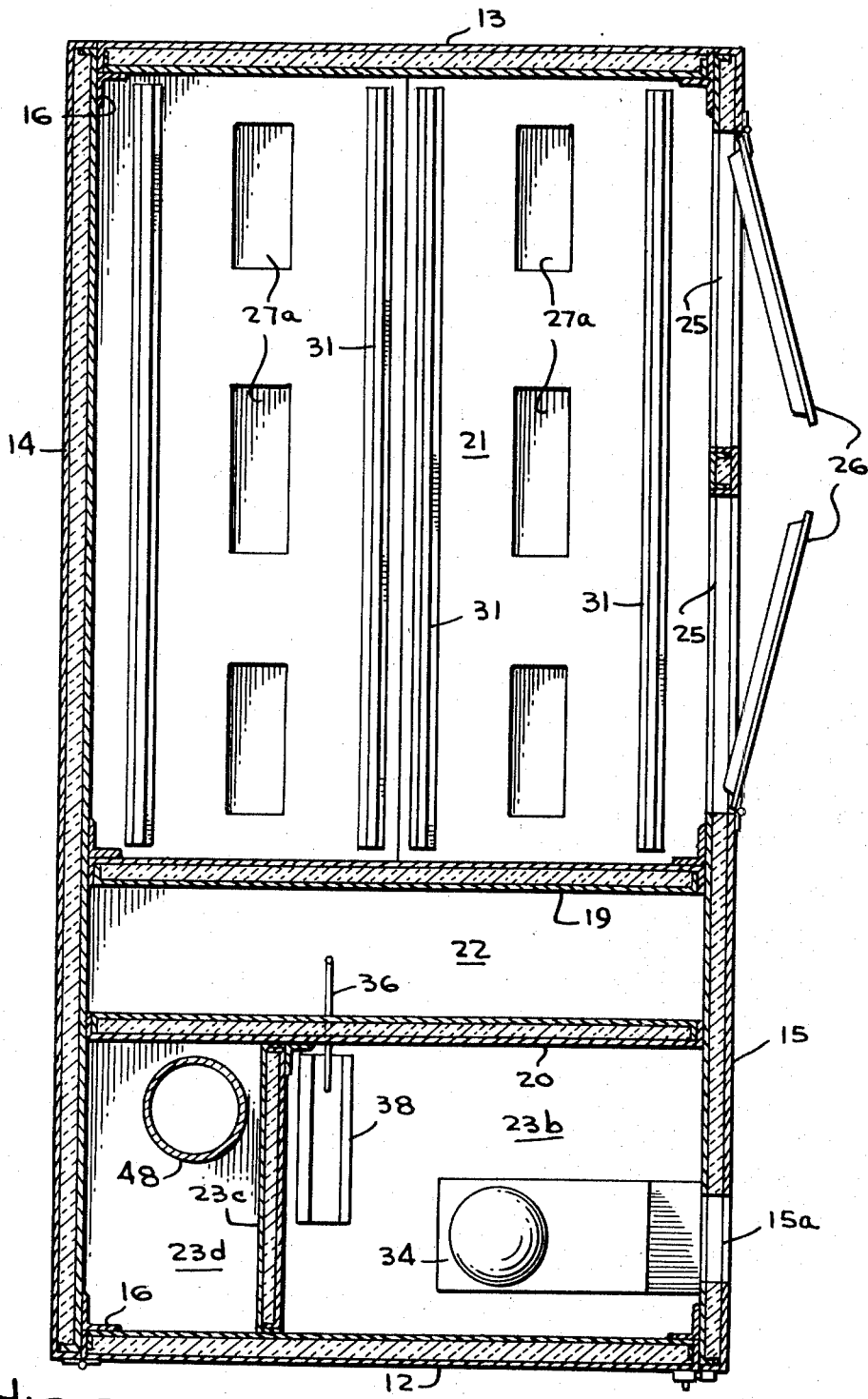
FIG. 5 is a horizontal section view of the apparatus, taken along the line 5—5 of FIG. 2.
Figure 6:
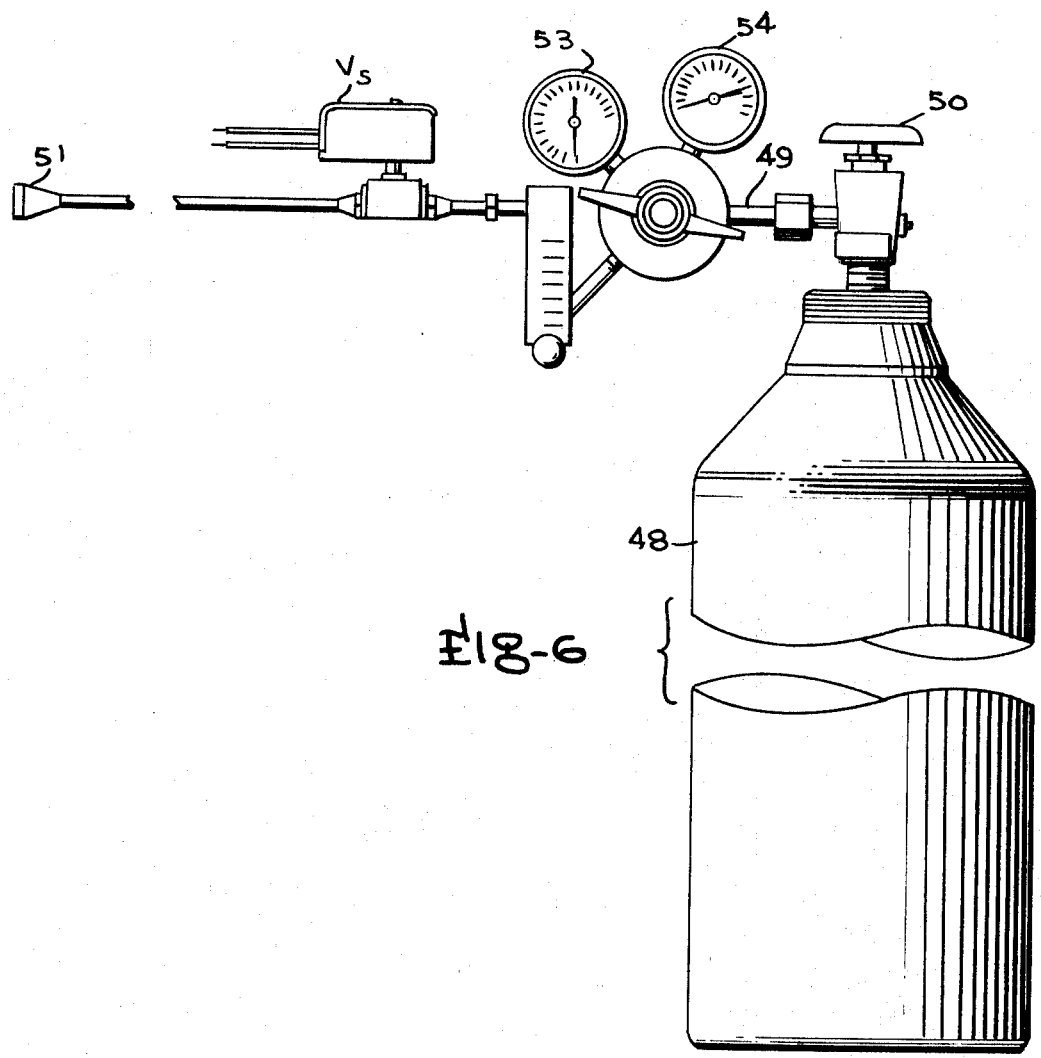
FIG. 6 is a fragmentary, diagrammatic view of the tank, conduit and control system for controlled supply of a mixture of ethylene and nitrogen gas to the ripening chamber of the apparatus.

Referring to the drawings, wherein like reference characters designate corresponding parts throughout the several figures, the apparatus for ripening fruit in accordance with the present invention is constructed in the form of an upright storage case 10 of generally rectangular configuration designed to be placed at any convenient location in the back storage room of a retail establishment and having a height, for example, of about 6½ feet. In the illustrated example, the storage case 10 comprises a base frame 11 made up of longitudinal channel beams 11a and transverse channel beams 11b, sidewalls 12 and 13, rear wall 14 and front wall 15, each formed of insulated panels of any desired conventional construction and secured at their lower portions to the base frame 11 and along their vertical edges to vertical angle iron corner frame members 16. A top wall 17 of similar panel construction is secured to horizontal top angle iron frame members 18, to form a sealed enclosure collectively with the side, rear and front walls. Preferably, the various wall members are secured to their associated frame members by screws extending through the frame members and into the wall members from the inside of the case to facilitate sealing of the case and minimize the possibility of the gases in the case from becoming dissipated through leaks.

The interior of the case is sub-divided by vertical partition panels 19 and 20, constructed in the manner similar to the panels forming the outer walls of the case, into a ripening compartment or chamber 21, located between the partition 19 and sidewall 13, and intermediate air treating chamber 22 between the partitions 19 and 20, and an instrumentation chamber, generally indicated at 23, located between the partition 20 and endwall 12. In a preferred example, the instrumentation chamber is sub-divided by vertical partition 23c and horizontal partition 24 into an upper chamber portion 23a, a lower chamber portion 23b, and a vertically elongated chamber portion 23d.

Preferably the sidewall 12 bounding the instrumentation chamber 23 is hinged along one vertical edge thereof and provided with a handle and latch set to permit opening of the sidewall 12 for servicing access to the instrumentation chamber 23 and adjustment of the instrumentalities therein. Also, the front wall 15 is provided with a door opening 25 which is approximately coextensive with the height and width of the ripening compartment 21, and a pair of hinged doors 26 for closing the door opening 25 having suitable sealing strips around the perimeters of the doors to maintain an effective seal when the doors are closed.

The ripening compartment 21 is designed to house plural stacks of fruit boxes having apertured box walls, and is provided with a false bottom or floor 27 having apertures 27a for passage of return air through the floor 27 into the air return space 28 provided below the floor, for example, by supporting the floor 27 on a frame of channel-shaped members 29 resting on the base frame 11 or, as shown in the illustrated embodiment, on horizontal angle iron members 30 resting on the uppermost flanges of the base frame members 11. Sub-floor panels 30a may be provided at the top plane of the base frame 11 defining the bottom of the air return space 28. Peripherally flanged, channel-shaped rails 31 may also be provided on the bottom or floor 27 at suitable locations to support the lowermost fruit box of each stack of fruit boxes in spaced position slightly above the plane of the floor 27.

Air and gases returned from the ripening compartment 21 through the openings 27a in the floor 27 into the air return space 28 are admitted into the air treating chamber 22 through air return opening 19a in the lowermost portion of the partition 19 and are drawn upwardly into inlet openings in a pair of double squirrel cage blowers 32 mounted in the upper region of the air treating chamber 22 and having their air discharge outlets communicating with air supply openings 19b in the uppermost portion of the partition 19 to discharge the air and gases longitudinally horizontally across the ripening compartment 21 immediately below the top wall 17. Disposed below the blowers 32 within the air treating chamber 22 is an evaporator or cooling coil 33 of conventional construction, for example, an elongated fin and tube evaporator coil, to cool the air rising from the air return opening 19a to the blowers 32. The evaporator coil 33 is intercoupled with a conventional compressor-condenser unit 34 located in the lower sub-compartment 23b of the instrumentation chamber 23 to form a conventional refrigeration system. The hinged sidewall 12 for the instrumentation chamber 23 is provided with suitable ventilation openings or louvres, indicated at 12a in FIG. 1, and the front wall 15 may be similarly provided with ventilator louvres 15a in the region of the sub-compartment 23b to provide for suitable ambient air circulation about the compressor-condenser unit 34.

Below the evaporator coil 33 and positioned to collect any liquid condensate that may be gravity discharged therefrom is a drain pan 35 having a drain tube 36 extending from the bottom thereof into the sub-compartment 23b to discharge the liquid condensate received by the pan 35 into a condensate evaporator 37.

Figure 7:
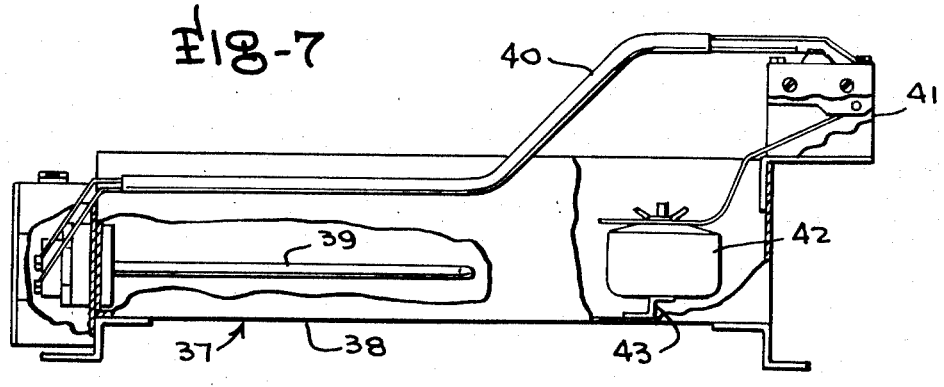
FIG. 7 is a side elevation view, with parts broken away of the evaporator pan assembly employed in the apparatus for avoiding undesirable accumulations of liquid condensate in the apparatus.

As is more clearly illustrated in FIG. 7, the condensate-evaporator 37 comprises an upwardly opening receptacle 38 below the discharge end of the drain tube 36 having an electrical resistance heater element 39, for example, of the sheathed hair pin loop type conventionally employed in water heaters, urns, and the like, supported in one end wall of the receptacle 38. The electrical supply to the heater element 39 through the supply conductor 40 is controlled by a snap-action switch 41 mounted on a suitable bracket fixed to the receptacle 38 and having a switch actuating lever 41a depending along an appropriate path into the receptacle 38 and connected to a float 42. The float normally rests on a supporting member 43 fixed to the bottom of the receptacle 38 to support the float at a selected level spaced above the bottom of the receptacle 38, and upon elevation of the level of the float 42, when the liquid condensate level in the receptacle 38 reaches a selected level, the actuating lever 41a is pivoted upwardly a sufficient distance to close the switch 41 and complete the supply circuit through the conductor 40 to the heating element 39. The heat generated by the heating element 39 boils off the liquid condensate in the receptacle 38 until a sufficiently low liquid level is restored in the receptacle to position the float 42 so that the switch 41 is opened. The vapor phase condensate thus boiled off from the condensate evaporator is conveyed to the outside of the case by the air currents flowing through the vents 12a and 15a and the sub-compartment 23b about the compressor-condenser unit. With this condensate collecting and evaporating system, the troublesome problem of disposing of liquid condensate is alleviated without requiring any special water disposal plumbing connections to be available in the storage room where the case is to be located.

An electrical heater of conventional construction, indicated by the reference character 44, is also located in the air treating chamber 22 below the blowers 32 and in a position to give off heat to the air being returned from the air return openings 19a to the blowers for elevating the temperature of the air being recirculated to the ripening chamber when conditions so require.

The upper sub-compartment 23 houses a plurality of adjustable thermostat units, collectively indicated by the reference character 45 in FIG. 2 and described in greater detail hereinafter, connected to remote temperature sensing bulbs 46 located in the ripening chamber 21, for example, adjacent the top of the partition 19, as shown in FIG. 2. An electrical panel box 47 also located in the sub-compartment 23a houses the electrical control circuitry, to be later described.

In the rearmost portion of the instrumentation chamber 23, for example, separated from the sub-compartments 23a and 23b by a vertical partition 23c, is the sub-compartment 23d for conveniently housing a tank or commercial cylinder 48 containing a mixture of ethylene and nitrogen gas, as later described in greater detail, and an outlet conduit system 49 leading from the cylinder 48 through the conventional manual control valve 50 to an outlet nozzle 51 terminating in the ripening chamber 21, for example, at the uppermost portion of the partition 19. Interposed in the conduit system 49 are a regulating valve 52, having meters 53 and 54 connected thereto for indicating the tank pressure and the regulated pressure, a flow meter 55, and a solenoid valve $V_s$, to be later described.

Figure 8:
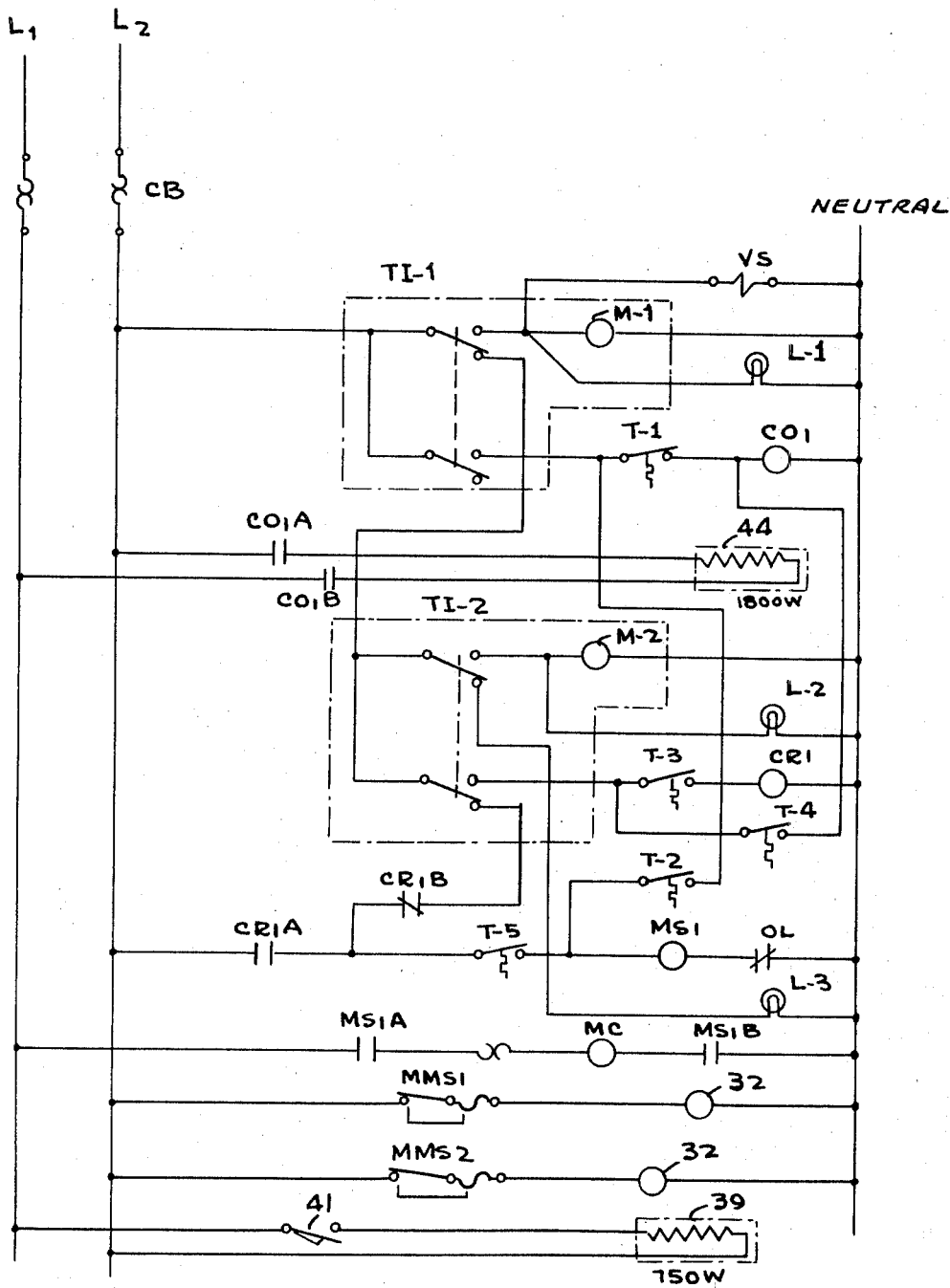
FIG. 8 is a schematic electrical diagram of the electrical control circuit employed in the apparatus.

A schematic diagram of an electrical control circuit suitable for cycling the ripening apparatus through the initiating stage, the de-greening and maturing stage, and the terminal low temperature stage while automatically regulating the temperature within the ripening chamber at the desired levels and admitting the mixture of ethylene and nitrogen gas to the ripening chamber during the initiating stage, is illustrated in FIG. 8. Referring to FIG. 8, the control circuit employs a pair of timers TI–1 and TI–2, which are preferably of a commercially available type having a manual push button by which a clutch on each timer is engaged to effect driving of the timing mechanism through its timing cycle and having manually adjustable means for setting the desired period. As shown in FIG. 8, the terminal of the timer TI–1 associated with the normally open upper contact is connected to the timer motor M–1, to the coil of the solenoid valve $V_s$ controlling the flow of the mixture of ethylene and nitrogen gas from the cylinder 48 to nozzle 51, and is also connected to a red lamp L–1 on the front wall 15 of the case to energize the lamp L–1 when the timer TI–1 is going through its timing cycle. The lower normally open contact of the timer TI–1 is connected to the thermostat T–1, set, for example, on 75° F., and connected in series with the coil of control relay CO–1, and this terminal is also connected through thermostat T–2, having a setting, for example, of 80° F., to one side of the motor starter MS–1 whose contacts MS–1A and MS–1B control the compressor motor MC. The contact CO–1A and CO–1B of the control relay CO–1 control the heater 44 in the air treating chamber 22 of the case.

The upper normally open contact of timer TI–2 is connected to the motor M2 of that timer and to a lamp L–2, for example, an amber lamp, to indicate when the timer TI–2 is going through its timing cycle. The normally closed upper contact of timer TI–2 is connected to green lamp L–3 to indicate when the timer TI–2 has completed its timing cycle. Thermostats T–3 and T–4 are connected to the lower normally open contact of timer TI–2, thermostat T–3 being set, for example, at 67° F., and being connected to the coil of relay CR–1, and thermostat T–4 being set at 56° F. and being connected to the coil of relay CO–1. The contact CR–1A and CR–1B of the relay CR–1 are connected, as shown, with the thermostat T–5, also set at 56° F., and with the motor starter MS–1.

Upon closing the circuit breaker CB in supply lines L–1 and L–2 connected to a nominal 220-volt supply and closing of the manual blower switches MMS–1 and MMS–2, the blowers 32 are energized to start air circulating through the air treating compartment 22 and into the ripening chamber 21. The ripening cycle is started by pushing the start buttons on each of the timers TI–1 and TI–2. Assuming the timer TI–1 is set on 22 hours, as a specific example, upon energizing the timer by pushing the start button, the contact arms shift upwardly from the position illustrated in FIG. 8, energizing the solenoid $V_s$ and the indicator lamp L–1. The solenoid $V_s$ stays energized for the duration of the time set on timer TI–1, allowing the mixture of ethylene and nitrogen (for example, 6 percent ethylene and 94 percent nitrogen) to flow into the ripening chamber 21 at a selected rate (for example, 0.1 SCFH). During the timing cycle of timer TI–1, the thermostat T–1 controls the heater 44 by energizing and de-energizing the relay CO–1 to maintain the temperature in the ripening chamber 21 in accordance with the thermostat setting. Also, during the timing cycle of TI–1, the thermostat T–2 will close should the temperature in the ripening chamber 21 rise above 80° and energize the starter MS–1, closing its contacts MS–1A and MS–1B to start the refrigeration system compressor motor MC. As soon as the temperature reduces to the setting of the thermostat T–2, the thermostat will open and de-energize the motor starter MS–1 to stop the compressor.

As soon as the timer TI–1 times out, the timer TI–2, which may be set on 38 hours as a specific example, is energized by the falling of the upper contact arm of timer TI–1 into engagement with the upper normally closed contact thereof, supplying current to thermostat T–3 and energizing the coil of relay CR–1. This closes the contacts CR–1A and opens contacts CR–1B, energizing the motor starter MS–1 to start the compressor motor MC and lower the temperature within the ripening chamber 21 to the temperature setting of the thermostat T–3. The cycle of timer TI–2 continues for the duration of the time set on the timer. Should the temperature in the ripening chamber 21 fall below the setting on the thermostat T–4, the thermostat T–4 will close and energize the relay CO–1, which closes its contacts CO–1A and CO–1B to energize the heater 44 and elevate the temperature of the air being supplied through blowers 32 into the ripening chamber 21.

As soon as the second timer TI–2 times out, current is supplied through the normally closed contacts CR–1B and thermostat T–5 to the motor starter MS–1, closing its contacts MS–1a and MS–1b and starting the compressor motor MC. This establishes the third or terminal low temperature cycle, and this holding cycle will continue until another ripening cycle is started by pushing the start buttons on timers TI–1 and TI–2 or until the main circuit breaker CB is turned off.

It will be apparent that the timers TI–1 and TI–2 should have a sufficient variation in timing cycle range to permit their adjustment to any of the desired times for the initiating stage and the de-greening and maturing stage, as described hereinafter in the more detailed description of the process and examples thereof. For example, the timer TI–1 should be adjustable to any time up to about 30 hours and the timer TI–2 should be adjustable to time out cycles up to about 60 hours. Similarly, the range of adjustment of the temperature settings for the thermostats T–1 to T–5 should cover a sufficient range to permit settings to the various temperatures or temperature ranges indicated in the ensuing detailed description of the process.

DETAILED DESCRIPTION OF THE PROCESS

The present process achieves a startling rapid ripening of fruit and attains the capability of longer shelf life for the fruit so ripened. This process is applicable to bananas, tomatoes, peas, avocadoes, melons (such as honeydew melons), and vegetables and, broadly, any fruit that may have comparable ripening characteristics. The process utilizes the apparatus described above and includes the basic and essential step of initiating a controlled automatic ripening. This initial and key process step forming an important aspect of this invention is the initiation of the ripening of unripe fruit under high uniform temperature conditions enabling the subsequent ripening to proceed rapidly without loss of quality. Thereafter, the de-greening or maturing of the fruit may be achieved in a second step or stage. To then obtain the full advantages of the ripening in accordance with the first two stages, primarily among which are long shelf life and good storage characteristics, the fruit may be subjected to a third stage of selected temperature conditions.

In order to ripen a fruit, such as a banana, it must undergo biochemical changes that precede visible ripening. Such changes are referred to here as initiation of ripening and include (1) an ethylene induced depression in respiratory rate; (2) changes in the synthesis of plant hormones, RNA and proteins, and (3) change from a depressed to a stimulated respiratory rate.

INITIATING RIPENING

In its broadest aspects, it has been discovered that through the present invention an initiation of ripening of boxed fruits may be forced by achieving and maintaining a fruit temperature within the range of 68° to 95° F. for a time between approximately 4 to 72 hours in an atmosphere that may contain between 0.05 and 30,000 ppm ethylene. The limits set forth for ethylene constitute the lowest effective range to achieve any of the advantages of the use of ethylene and the upper limit is fixed solely by reason of the explosiveness of mixtures of ethylene having greater concentration than 30,000 ppm.

During the initiation ripening stage, a biochemical process is begun through the introduction of the ripening hormone ethylene. Within the specific temperature range of 68° to 95° F. and within the specified ethylene concentration, the protein hormonal production accelerates to achieve a rapid impetus toward ripening of the fruit. It is an important advantage of this invention that virtually every fruit in the box, regardless of the variety, achieves a simultaneous initiation of this biochemical process, thus assuring the greatest uniformity possible. The boxed fruit, upon being subjected to the temperature specified and the ethylene concentration, undergoes biochemical changes which, although such changes may not be visible even after completion of this stage, nevertheless enable the fruit to enter the next stage where ripening noticeably occurs within a time that would not have been possible except for the previous initiation of ripening.

It is important for the success of the ripening procedures of the present invention that the times, temperatures, and concentration of ethylene be followed to prevent poor quality fruit at the end of the ripening stage. A temperature higher than that specified, for instance, has been found to produce damage and injury to the peel, whereas lower temperatures prolong the ripening process to an extent wherein an important advantage, the economy of the present process, is lost. The forced gaseous flow of air with ethylene and an inert diluent which is in continuous contact with the fruit in the boxes through the openings in these boxes is a factor in achieving uniformity of temperature within the boxes, and particularly with respect to the fruit located within the interior of the boxes.

The concentration of ethylene has been found to be variable and may be in as low a concentration as that providing a saturation of the ethylene hormones for the most effective initiation. It has been found that in practical application, continuous injection of the ethylene gas with nitrogen or other inert gas up to about 95 percent assures safety and also provides a more uniform exposure of the fruit to ethylene.

RIPENING

In the second stage, which may be referred to as the actual ripening stage, wherein actual de-greening or maturing occurs, the temperature must be maintained within a range between 58° and 75° F. for a time between 10 and 96 hours. In the ripening stage, no ethylene should be used, since such further hormonal addition may reduce the quality of the fruit.

In the ripening stage, there is a great increase in respiratory rate which at its maximum is often as high as seven times that of green uninitiated fruit. The fruit, though still green, has now been irreversibly initiated to ripen. Heat is produced in conjunction with the rise in rate of respiration. During this stage the enzymes of the cell, or its biochemical machinery, are being freed or synthesized to make possible the many changes which will occur in the latter part of this stage. Phosphorus and other inorganic minerals move freely as cell wall and cell organelle permeability increase. Hemicellulose hydrolysis begins and "active" tannin destruction occurs. These tannins incidentally are responsible for the astringency of green fruit. A decrease in protopectin in the middle lamella of cells also takes place along with an increase in soluble pectin, which is associated with softening.

All of these previously mentioned changes continue into the period where chlorophyll degradation becomes apparent. Heat production and respiratory rate quickly reach their maximum and softening occurs. Other changes are the conversion of starch and additional hemicellulose to sucrose, glucose, and fructose; the synthesis and freeing of vitamin C and other vitamins; the degradation of "active" tannins; completion of the conversion of protopectin to soluble pectin the synthesis of carotenes; the production of malic acid and other organic acids; the qualitative change in lipids and fatty acids; an increase in osmotic pressure; increase in respiratory quotant, and synthesis of flavor constituents.

After passing through the high temperature initiation of ripening stage and the ripening or de-greening stage, the fruit is in an acceptable state for consumption, although preferably the fruit would be about one day early in maturity if the fruits are to be displayed to the public. Thereafter, it is preferable, though not essential, that the fruit be maintained at a temperature of 56° to 80° F., which will assure a rather lengthy storage life up to as much as two weeks.

While broad ranges have been set forth for the processing of many fruits according to the present invention, for particular fruits certain more specific ranges have been found to be desirable. Particularly with respect to bananas, it has been discovered that the initiation of ripening stage is best achieved within a temperature range of 68° through 85° F., preferably 73° to 85° F. To achieve the maximum benefits, the temperature should be 72° to 75° F. The time for the initiation is found to be preferably within 18 to 24 hours, but may extend within 4 to 35 hours. The concentration of ethylene is most efficient when maintained between 25 and 1,000 ppm, although concentrations of 0.05 to 30,000 are permitted.

In the ripening or de-greening stage with bananas, it has been found that a temperature range of 58° to 75° F., and more preferably 66° to 70° F., is particularly advantageous. The time for the bananas within the ripening stage may extend between 10 and 96 hours, but more preferably 20 to 40 hours.

These temperatures are important to achieve high quality ripened bananas. If the temperature is too high, certain reactions are faster than they should be and poor quality ripe fruit results. This gives fruit with off-flavors a short shelf life and a peel which very easily develops injuries and black or brown areas. The pulp softens rapidly. If too low a temperature is used during stage two, the pigments and tannins continue their ripening changes faster than the starch to sugar conversions, organic acid changes or synthesis of flavor constituents. Thus the ripe fruit appears riper than its eating qualities would indicate. This results in flavorless fruit, lacking in sweetness and organic acids, as well as a mealy texture. The forced air flow in accordance with this invention assures the necessary uniformity of temperature of the boxed fruit and avoids hot spots.

After the bananas have undergone the foregoing two stages, if they are maintained at a temperature of 56° to 80° F., and more particularly 60° to 70° F., a storage life of up to 10 days to 2 weeks is permissible. Such a shelf life enables the fruit merchandiser to display the bananas for a substantially longer period of time without fear of spoilage than had ever been achieved by any previous process.

Specific examples of the process of the present invention utilizing the previously described apparatus are as follows:

EXAMPLE I

| Fruit Varieties | Fruit Temperature (°F.) | Time for Initiation (hrs) | Ethylene (ppm) |
|---|---|---|---|
| I. Valery - Lacatan | 85 | 9 | 5 – 100 |
| Giant Cavendish | 80 | 11 | 5 – 100 |
| and other | 70 | 16 | 5 – 100 |
| Cavendish type | 65 | 22 | 5 – 100 |
| fruit | 60 | 37 | 5 – 100 |
| II. Gros Michel and | 85 | 6 | 5 – 100 |
| Cocos | 80 | 7 | 5 – 100 |
|  | 70 | 11 | 5 – 100 |
|  | 65 | 16 | 5 – 100 |
|  | 60 | 24 | 5 – 100 |

NOTE:
A. The ethylene concentration fluctuated substantially, due to leaks. The ethylene gas was therefore continuously introduced, resulting in an average concentration of about 25 ppm.
B. All fruit was packed in the usual cardboard boxes of 40 lbs. capacity, with openings on the top and all sides.

After the initiation of the ripening, the bananas pass through the second stage during which visible organic ripening changes occur due to the enzyme synthesis. The following example is illustrative:

EXAMPLE II

Two portions of the initiated bananas from Example I, identified as Group I and Group II, were subjected to temperatures of 60° F. for 96 hours and 72° F. for 36 hours and upon completion of this second or ripening stage, the bananas of both groups were found to be about color 3–4, which is exactly the degree of ripeness most acceptable to fruit merchandisers for display. Taste and aroma of these bananas were excellent.

In order to maintain as long a shelf life as possible and to achieve the maximum from the preceding ripening stages, the treated bananas were held at a temperature 60° F. for 10 days. During this entire period of time, the bananas were found to be of good marketable quality and acceptable to any fruit merchandiser for sale to the public.

The present invention is also particularly applicable to tomatoes, since tomato ripening is quite similar to the ripening of bananas. To initiate ripening in tomatoes, the fruit temperature range should be from 68° to 95° F., preferably 72° to 92° F. while in an atmosphere containing ethylene in an amount between 0.05 and 30,000 ppm, preferably 25 – 1,000 ppm, for a time that may be between 24 and 72 hours.

In the ripening stage the tomatoes are to be held at a fruit temperature of 58° to 72° F., preferably 60° to 72° for a time between 24 and 96 hours, or preferably 60 to 96 hours without need of any ethylene concentration.

Tomatoes, after passing through the two distinct stages may then be kept up to as long as 2 weeks at a temperature between 58° and 80° F. or preferably 60° to 72° F. Such a shelf life is totally unique to any fruit merchandiser.

A specific example illustrating the effectiveness of the present invention for tomatoes is as follows:

EXAMPLE III

Twenty boxes of 6 × 6 and two boxes of 5 × 5 Pearson Early Pack tomatoes, "Meyers Pride" from King City, California were picked, washed, graded, and waxed. The fruit was divided into Groups I and II.

GROUP I

Twenty boxes (18 of 6 × 6 and two of 5 × 5) were initiated for 64 hours at 83° F. with between 10 and 20 ppm ethylene delivered as 0.1 SCFH of 6 percent ethylene in nitrogen. (The nitrogen was added only as a safety precaution.) The fruit in three boxes was marked individually as to their color grade. After the initiation period, the ethylene flow was stopped and the temperature cycled to 70° F. The fruit was held at this temperature for an additional period to the total times shown in Table I below:

TABLE I

RIPENING OF TOMATOES - PRESENT INVENTION (GROUP I)

| Total Time (hrs) | Percent having each color number | | | | | | | |
|---|---|---|---|---|---|---|---|---|
| | 0 | 1 | 2 | 3 | 4 | 5 | 6 | Rotten |
| 137 | 0 | 1 | 2 | 7.3 | 83.5 | 6.3 | 0.0 | 0.0 |
| 160 | 0 | 0 | 0 | 5.2 | 69.0 | 17.7 | 0.0 | 0.0 |

GROUP II

One box was held at 72° F. with no ethylene for the entire period. This served as a control to indicate ripening without initiation.

The results of the treatment of the tomatoes in accordance with the procedures set forth for Group II are set forth in Table II:

TABLE II

RIPENING OF TOMATOES IN AIR AT 72° F. (GROUP II)

| Total Time (hrs) | Percent having each color number | | | | | | | |
|---|---|---|---|---|---|---|---|---|
| | 0 | 1 | 2 | 3 | 4 | 5 | 6 | Rotten |
| 137 | 12.8 | 6.4 | 8.5 | 10.7 | 25.6 | 36.2 | 0.0 | 0.0 |
| 167 | 6.4 | 3.2 | 6.4 | 6.4 | 21.3 | 46.8 | 6.4 | 3.2 |

From the Tables it will be evident that the procedure of the present invention produced a far more uniform ripening of the tomatoes where it can be seen that the substantial majority of the tomatoes are of a group 4 coloring — that is, a substantially red color with little, if any, green and none of the No. 6 color which is the deep red attained just prior to substantial softness characteristic of a rotten fruit. Also, most of the fruit is in at least color No. 3, meaning that some red appears on the tomato. In contrast, the tomatoes of Group II are clearly seen to be of no uniformity, having spread substantially across the color scale including a few rotten tomatoes. From the above, it may be stated that the treatment in accordance with the present invention produced desirable commercially acceptable tomatoes for immediate display and sale.

The tomatoes of Group I were able to be kept at a temperature of between 58° and 60° for up to 2 weeks in display, during which time the tomatoes would be found to have good color, texture, and flavor, and not be overly ripe or too soft.

In accordance with another aspect of the present invention, it was discovered that tomatoes which have achieved some initiation of ripening that may have occurred due to maturity of the fruit, may be retarded in further ripening, while the tomatoes within the same group that may not have initiated ripening may be forced into an initiation of ripening so that a greater uniformity may be achieved between the tomatoes. Through the use of higher temperatures in the initiation of ripening cycle, it was discovered that particularly high heat within a narrow range would inactivate fruit already initiated, and thus, when all of the fruit would subsequently pass through the second stage or ripening stage, there would be produced more uniform color grades of 2 to 4 presently considered desirable by the fruit merchandiser for initial display for the customer. The inactivation of the fruit which may have previously been initiated is based upon the discovery that at a temperature above 86° F., the red pigment, lycopene, will not be produced in the tomato. At a fruit temperature range of over 86° to 95° F., therefore, previously initiated fruit will not progress in a ripening stage. However, the temperature is such that in the presence of ethylene, as previously described, there will be produced an initiation of the ripening, forcing the previously unripe and uninitiated fruit to be brought closer in maturity to the unripe, but ripening, or previously initiated fruit. The following experiment illustrates the manner in which uniform ripening may be readily achieved:

EXAMPLE IV

GROUP I

Twenty boxes with the usual openings were placed in the apparatus of this invention and ripening initiated for 48 hours at 87° F. pulp temperature with 10 – 17 ppm ethylene from 6 percent ethylene in nitrogen flowing at 0.1 SCFH into the openings in the box. After this the machine cycled to 71° F. without ethylene for 48 hours, at the end of which four boxes were removed at random and color graded and placed back inside the machine. At this time the machine was cycled to 63° F. for the remainder of the experiment. At 9 days, 15 of the boxes were removed and the other five continued in the chamber.

GROUP II

One box was placed in a tent with air, without ethylene, at 72° F.

The groups were placed in their chambers with no sorting or extra handling of any kind and were left untouched until the fourth day when 20 percent of the boxes in the machine were color graded along with the control and then not touched until the ninth day, when 10 percent more were graded along with the ones previously graded.

The fruit was rated for color on the fourth, eighth and 14th days. Table II summarizes these results.

TABLE II

Percent of Tomatoes in Each Color Grade

Present Invention (Group I)

| Time (days) | Color Number | | | | | | | |
|---|---|---|---|---|---|---|---|---|
| | 0 | 1 | 2 | 3 | 4 | 5 | 6 | Rotten |
| 0 | 85 | 10 | 5 | 0 | 0 | 0 | 0 | 0 |
| 4 | 0.1 | 5.6 | 33.7 | 56.1 | 2.4 | 0.1 | 0 | 2.2 |
| 8 | 0 | 0 | 0 | 2.3 | 21.6 | 69.5 | 0 | 5.1 |
| 14 | 0 | 0 | 0 | 0 | 1.4 | 8.0 | 70 | 20.0 |

No Ethylene (Group II)

| | 0 | 1 | 2 | 3 | 4 | 5 | 6 | Rotten |
|---|---|---|---|---|---|---|---|---|
| 0 | 85 | 11 | 4 | 0 | 0 | 0 | 0 | 0 |
| 4 | 14.8 | 17.6 | 9.1 | 31.2 | 23.8 | 2.3 | 0 | 1.2 |
| 8 | 1.7 | 0 | 1.2 | 6.3 | 10.4 | 45.2 | 19.1 | 13.9 |
| 14 | 0 | 0 | 0 | 0 | 0 | 3.0 | 65 | 32.0 |

The most striking and significant results are indicated with the fruit in Group I of EXAMPLE IV. The 87° held back the faster ripening fruit, while at the same time accelerating the initiation of the slower ripening fruit. It, therefore, served as an equalizer of fruit variability. Color development occurred after the temperature was reduced. After four days 89.8 percent of the fruit was in color grades 2 and 3, or the "pink" stage desired by markets. Without this temperature sequencing, 40.3 percent of the fruit was in this "pink" stage.

The present process significantly reduced the percentage of rotting fruit both during ripening and during holding. The fruit which started rotting first served as a source of infection for adjacent fruit. Thus, if rotten fruit was not progressively sorted out, it greatly amplified the rotting (more than doubled the percent of rotten fruit).

The carbon dioxide concentration in the apparatus varied between 0.01 percent and 0.09 percent during the experiment. The ethylene concentration varied between 10.3 ppm and 19.2 ppm during the initiation cycle.

It has also been discovered that longer shelf life has been obtained when the fruit was initiated to ripening in air and ethylene concentration, but maintained at a low oxygen concentration during the second or ripening stage. The most important period for obtaining the prolonged shelf life was found to be 3 to 5 days following the initiation when most of the respiratory and biochemical action ceased. The presence of ethylene in an amount previously found desirable, if used during the second or ripening stage, in an amount between 0.05 and 30,000 ppm while maintaining a concentration of oxygen between about 0.5 and 2.5 percent, and preferably 0.8 – 1.5 percent, by volume standard conditions is effective. Low oxygen concentrations were found to be significant only during the ripening or second stage. The presence of ethylene during this second stage helped to accelerate the changes and increase the rate of ripening and the length of shelf life. While the results were not as satisfactory without the presence of ethylene with the low concentration of oxygen in the ripening stage, there was nevertheless approximately 50 percent gain in shelf life through the combination of low oxygen atmosphere and ethylene during ripening stage. The effectiveness of low oxygen concentration was found to exist for bananas or tomatoes or other comparable fruits.

It should be manifest from the foregoing description of the process that complete control over the ripening of fruits is achieved and, importantly, (a) the entire ripening process is accelerated, while (b) the shelf life may be extended substantially beyond the several days commonly experienced to a period as long as 10 to 14 days. Obviously, the advantages accruing to the fruit merchandiser are numerous including the substantial reduction in warehousing and ripening rooms, and, importantly, substantial reduction in the spoilage of the fruit. Not to be overlooked is the fact that uniform color quality, including taste and appearance, are also readily obtainable for the first time.

What is claimed is:

1. Apparatus for automatically ripening fruits, such as bananas and the like, through a selected ripening program, comprising a casing having insulated wall means defining a ripening chamber providing a closed space to contain a quantity of the fruit to be ripened while the space is conditioned through said selected ripening program, means within said casing defining an air treating chamber having air return and supply passages communicating with said ripening chamber, blower means for circulation of air in a closed loop path serially through said air treating chamber and ripening chamber, refrigeration means including a cooling coil in said air treating chamber for cooling the air circulating therethrough, said air treating chamber including heating means for heating the air circulating in said path, means including a solenoid regulating valve for selectively supplying ethylene gas into said ripening chamber, first and second timer switch means each settable to a selected range of time periods, first and second thermostat means responsive to the temperature in said ripening chamber and respectively coupled from said first timer switch means to said refrigeration means and to said heating means for automatically activating said refrigeration means and heating means to maintain a first selected temperature range in said ripening chamber throughout a first conditioning stage in said ripening program for a time duration determined by the setting of said first timer switch means, means connecting said first timer switch means with said solenoid regulating valve for conditioning the latter to admit ethylene gas therethrough at a selected rate during said first conditioning stage, third and fourth thermostat means responsive to the temperature in said ripening chamber and respectively coupled from said second timer switch means to said refrigeration means and to said heating means for automatically activating said refrigeration means and heating means to maintain a second selected temperature range below said first temperature range throughout a second conditioning stage in said ripening program for a time duration determined by the setting of said second timer switch means, and means interconnecting said first and second timer switch means to condition the second timer switch means to enable said third and fourth thermostat means to activate said refrigeration means and said heating means only after said first timer switch means has timed out said first conditioning stage.

2. Apparatus for automatically ripening fruits as defined in claim 1, including fifth thermostat means conditioned by said second timer switch means when the latter has timed out said second conditioning stage for activating said refrigeration means to maintain a selected third temperature range in said ripening chamber during a third conditioning stage of said ripening program.

3. Apparatus for automatically ripening fruits as defined in claim 1, wherein said casing includes a compartment having a storage tank containing ethylene gas under pressure therein, and said means for selectively supplying ethylene gas to said ripening chamber including outlet conduit means communicating with said tank having a discharge nozzle located in said ripening chamber and including said solenoid regulating valve between said tank and said nozzle.

4. Apparatus for automatically ripening fruits as defined in claim 1, including an upwardly opening drain pan in said air treating chamber located below said cooling coil to receive any liquid condensate which may form on and drip from exterior surfaces of said cooling coil, said casing including a compartment spaced from said air treating chamber and ripening chamber in communication with ambient air, an evaporator receptacle in said compartment, drain tube means connecting said drain pan with said receptacle for conveying the liquid condensate received in said drain pan to said receptacle, electric heater means in said receptacle for boiling off condensate accumulating in said receptacle, float means in said receptacle, and switch means activated by said float means for energizing said electric heater means when said float means indicates a selected liquid level in said receptacle.

5. Apparatus for automatically ripening fruits as defined in claim 1, wherein said first timer switch means is settable to time periods of up to about 72 hours and said second timer switch means is settable to time periods up to about 192 hours.

* * * * *